US012652661B2

(12) United States Patent
Kwon et al.

(10) Patent No.: US 12,652,661 B2
(45) Date of Patent: Jun. 9, 2026

(54) TRANSMISSION BEAM CONTROL IN WIRELESS COMMUNICATION SYSTEMS

(71) Applicant: Huawei Technologies Co., Ltd., Shenzhen (CN)

(72) Inventors: Young Hoon Kwon, Seongnam-si (KR); Pengfei Xia, San Diego, CA (US); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 494 days.

(21) Appl. No.: 17/629,661

(22) PCT Filed: Dec. 31, 2019

(86) PCT No.: PCT/US2019/069122
§ 371 (c)(1),
(2) Date: Jan. 24, 2022

(87) PCT Pub. No.: WO2020/113241
PCT Pub. Date: Jun. 4, 2020

(65) Prior Publication Data
US 2022/0256524 A1        Aug. 11, 2022

Related U.S. Application Data

(60) Provisional application No. 62/878,443, filed on Jul. 25, 2019.

(51) Int. Cl.
*H04W 76/14* (2018.01)
*H04W 72/044* (2023.01)

(52) U.S. Cl.
CPC ......... *H04W 72/046* (2013.01); *H04W 76/14* (2018.02)

(58) Field of Classification Search
USPC ........................................... 370/329
See application file for complete search history.

(56) References Cited

U.S. PATENT DOCUMENTS

| | | | | |
|---|---|---|---|---|
| 9,794,093 B1 * | 10/2017 | Haman | ................. | H04L 5/0051 |
| 2016/0277954 A1 * | 9/2016 | Frenne | ................. | H04W 72/541 |
| 2018/0331738 A1 * | 11/2018 | Agrawal | ............... | H04B 7/0695 |
| 2019/0238273 A1 * | 8/2019 | Wu | ........................ | H04W 8/005 |
| 2019/0254110 A1 * | 8/2019 | He | ......................... | H04W 76/28 |
| 2020/0100119 A1 * | 3/2020 | Byun | .................... | H04W 76/14 |
| 2020/0366421 A1 * | 11/2020 | Tang | ..................... | H04L 1/1867 |

(Continued)

OTHER PUBLICATIONS

ETRI, "Discussion on NR V2X Sidelink Design," R1-1902439, 3GPP TSG RAN WG1 Meeting #96, Feb. 25-Mar. 1, 2019, 6 pages.

(Continued)

*Primary Examiner* — Gregory B Sefcheck
*Assistant Examiner* — Majid Esmaeilian
(74) *Attorney, Agent, or Firm* — Slater Matsil, LLP

(57) ABSTRACT

A computer-implemented method for transmission beam control in a data communication by an electronic device includes scheduling a periodic data transmission to a second electronic device on a first resource using at least a first beam and a second beam during a first time period. The electronic device transmits data, through a sidelink between the electronic device and the second electronic device, to the second electronic device on the first resource using at least the first beam and the second beam during the first time period.

9 Claims, 5 Drawing Sheets

(56)         References Cited

U.S. PATENT DOCUMENTS

| | | | | |
|---|---|---|---|---|
| 2021/0243796 A1* | 8/2021 | Panteleev | ............. | H04W 74/08 |
| 2021/0250118 A1* | 8/2021 | Roth-Mandutz | ...... | H04W 76/14 |
| 2022/0232521 A1* | 7/2022 | Yoshioka | ............. | H04L 5/0037 |
| 2022/0272726 A1* | 8/2022 | Wang | ................... | H04L 1/1812 |
| 2022/0286248 A1* | 9/2022 | Yoshioka | ............. | H04L 5/0048 |
| 2022/0321278 A1* | 10/2022 | Yoshioka | ............. | H04L 1/1854 |
| 2022/0417867 A1* | 12/2022 | Yoshioka | ........... | H04W 52/325 |
| 2023/0119446 A1* | 4/2023 | Wang | ................... | H04W 72/20 |
| | | | | 370/329 |
| 2023/0171796 A1* | 6/2023 | Ji | ........................ | H04W 72/542 |
| | | | | 370/329 |
| 2023/0269754 A1* | 8/2023 | Ye | ............................ | H04L 1/00 |
| | | | | 370/329 |
| 2023/0328731 A1* | 10/2023 | Elshafie | ............... | H04W 72/25 |
| | | | | 370/329 |
| 2023/0370942 A1* | 11/2023 | Zhou | ................ | H04W 52/0216 |

OTHER PUBLICATIONS

CATT, "Design and evaluation of S-SSB for NR V2X Sidelink," R1-1900322, 3GPP TSG RAN WG1 Ad-Hoc Meeting 1901, Jan. 21-25, 2019, 14 pages.

* cited by examiner

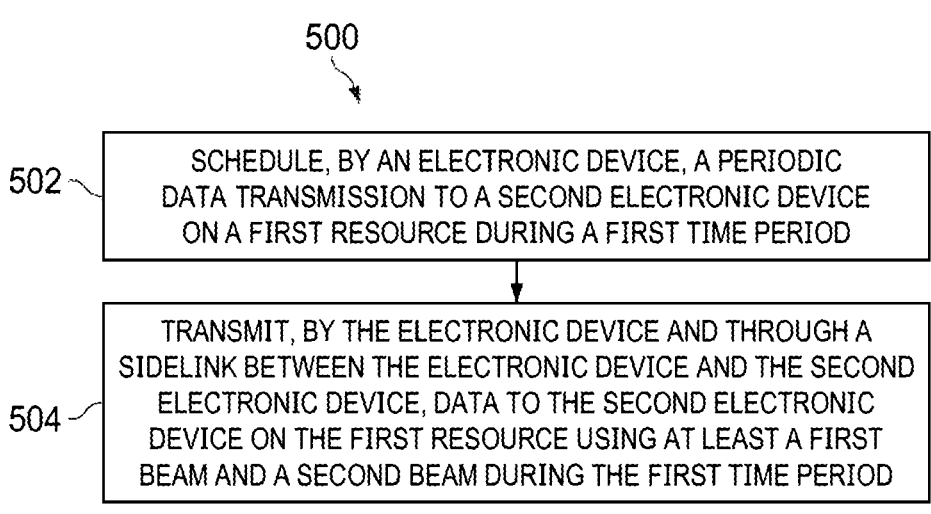

500

502 — SCHEDULE, BY AN ELECTRONIC DEVICE, A PERIODIC DATA TRANSMISSION TO A SECOND ELECTRONIC DEVICE ON A FIRST RESOURCE DURING A FIRST TIME PERIOD

504 — TRANSMIT, BY THE ELECTRONIC DEVICE AND THROUGH A SIDELINK BETWEEN THE ELECTRONIC DEVICE AND THE SECOND ELECTRONIC DEVICE, DATA TO THE SECOND ELECTRONIC DEVICE ON THE FIRST RESOURCE USING AT LEAST A FIRST BEAM AND A SECOND BEAM DURING THE FIRST TIME PERIOD

FIG. 5

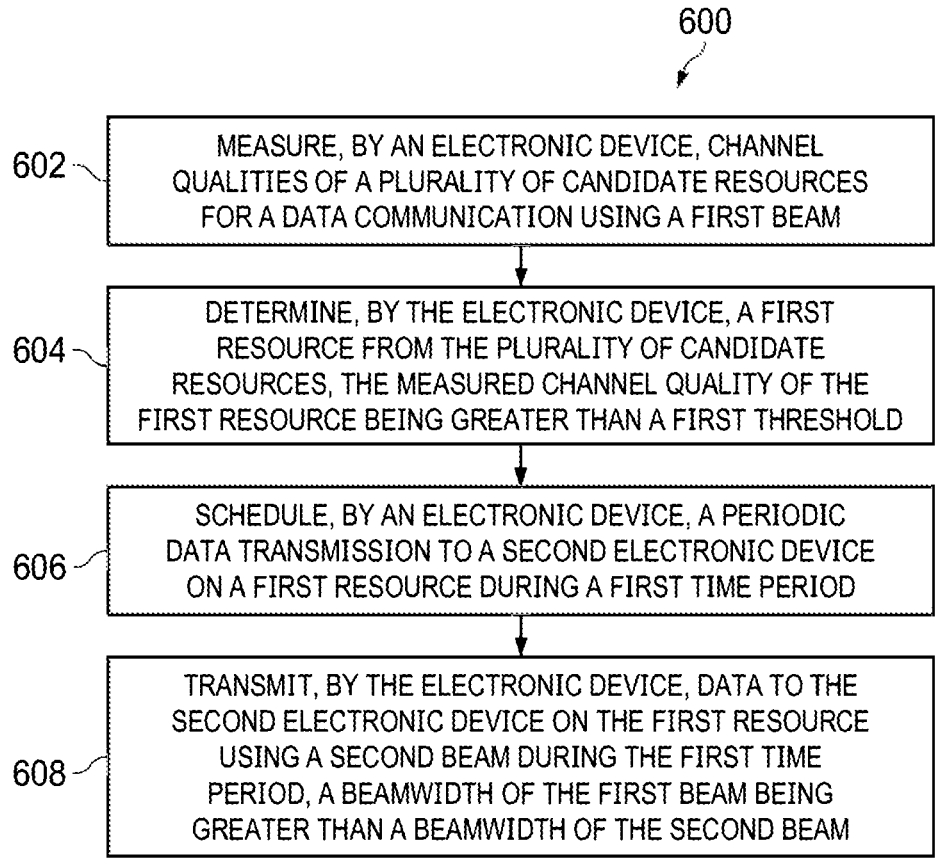

600

602 — MEASURE, BY AN ELECTRONIC DEVICE, CHANNEL QUALITIES OF A PLURALITY OF CANDIDATE RESOURCES FOR A DATA COMMUNICATION USING A FIRST BEAM

604 — DETERMINE, BY THE ELECTRONIC DEVICE, A FIRST RESOURCE FROM THE PLURALITY OF CANDIDATE RESOURCES, THE MEASURED CHANNEL QUALITY OF THE FIRST RESOURCE BEING GREATER THAN A FIRST THRESHOLD

606 — SCHEDULE, BY AN ELECTRONIC DEVICE, A PERIODIC DATA TRANSMISSION TO A SECOND ELECTRONIC DEVICE ON A FIRST RESOURCE DURING A FIRST TIME PERIOD

608 — TRANSMIT, BY THE ELECTRONIC DEVICE, DATA TO THE SECOND ELECTRONIC DEVICE ON THE FIRST RESOURCE USING A SECOND BEAM DURING THE FIRST TIME PERIOD, A BEAMWIDTH OF THE FIRST BEAM BEING GREATER THAN A BEAMWIDTH OF THE SECOND BEAM

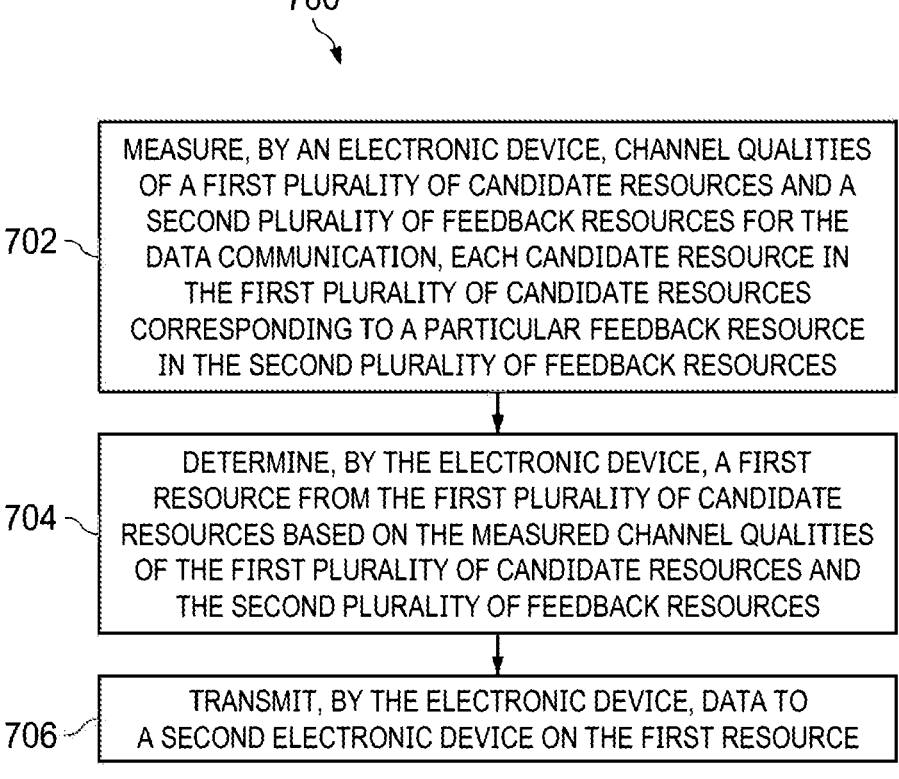

702 — MEASURE, BY AN ELECTRONIC DEVICE, CHANNEL QUALITIES OF A FIRST PLURALITY OF CANDIDATE RESOURCES AND A SECOND PLURALITY OF FEEDBACK RESOURCES FOR THE DATA COMMUNICATION, EACH CANDIDATE RESOURCE IN THE FIRST PLURALITY OF CANDIDATE RESOURCES CORRESPONDING TO A PARTICULAR FEEDBACK RESOURCE IN THE SECOND PLURALITY OF FEEDBACK RESOURCES

704 — DETERMINE, BY THE ELECTRONIC DEVICE, A FIRST RESOURCE FROM THE FIRST PLURALITY OF CANDIDATE RESOURCES BASED ON THE MEASURED CHANNEL QUALITIES OF THE FIRST PLURALITY OF CANDIDATE RESOURCES AND THE SECOND PLURALITY OF FEEDBACK RESOURCES

706 — TRANSMIT, BY THE ELECTRONIC DEVICE, DATA TO A SECOND ELECTRONIC DEVICE ON THE FIRST RESOURCE

FIG. 7

TRANSMISSION BEAM CONTROL IN WIRELESS COMMUNICATION SYSTEMS

PRIORITY CLAIM AND CROSS-REFERENCE

This application is a national phase filing under section 371 of PCT/US2019/069122 entitled "Transmission Beam Control in Wireless Communication Systems," and filed on Dec. 31, 2019 which claims the priority of U.S. Patent Provisional Application No. 62/878,443, filed on Jul. 25, 2019, applications of which are incorporated herein by reference in their entireties.

TECHNICAL FIELD

This disclosure relates to transmission beam control in wireless communication systems, particularly, for sidelink communication.

BACKGROUND

In Long Term Evolution (LTE), direct communication between user equipment (UE) is desirable. Different from an uplink or a downlink, a sidelink can be defined specifically for direct UE to UE communication without going through a serving base station.

SUMMARY OF THE INVENTION

The present disclosure describes transmission beam control in wireless communication systems.

In a first implementation, a method by an electronic device for transmission beam control in a data communication includes: scheduling a periodic data transmission to a second electronic device on a first resource using at least a first beam and a second beam during a first time period; and transmitting data, through a sidelink between the electronic device and the second electronic device, to the second electronic device on the first resource using at least the first beam and the second beam during the first time period.

In a second implementation, an electronic device includes: a non-transitory memory storage comprising instructions; and one or more hardware processors in communication with the memory storage, where the one or more hardware processors execute the instructions to perform operations comprising: scheduling a periodic data transmission to a second electronic device on a first resource using at least a first beam and a second beam during a first time period; and transmitting data, through a sidelink between the electronic device and the second electronic device, to the second electronic device on the first resource using at least the first beam and the second beam during the first time period.

In a third implementation, a non-transitory computer-readable medium storing computer instructions for transmission beam control in a data communication, that when executed by one or more hardware processors, cause the one or more hardware processors to perform operations including: scheduling a periodic data transmission to a second electronic device on a first resource using at least a first beam and a second beam during a first time period; and transmitting data, through a sidelink, to the second electronic device on the first resource using at least the first beam and the second beam during the first time period.

In a fourth implementation, a method by an electronic device for transmission beam control in a data communication includes: measuring channel qualities of a plurality of candidate resources for the data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

In a fifth implementation, an electronic device includes: a non-transitory memory storage comprising instructions; and one or more hardware processors in communication with the memory storage, where the one or more hardware processors execute the instructions to perform operations comprising: measuring channel qualities of a plurality of candidate resources for a data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

In a sixth implementation, a non-transitory computer-readable medium storing computer instructions for transmission beam control in a data communication, that when executed by one or more hardware processors, cause the one or more hardware processors to perform operations including: measuring channel qualities of a plurality of candidate resources for the data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

In a seventh implementation, a method by an electronic device for transmission beam control in a data communication includes: measuring channel qualities of a first plurality of candidate resources and a second plurality of feedback resources for the data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

In an eighth implementation, an electronic device includes: a non-transitory memory storage comprising instructions; and one or more hardware processors in communication with the memory storage, where the one or more hardware processors execute the instructions to perform operations comprising: measuring channel qualities of a first plurality of candidate resources and a second plurality of feedback resources for a data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

In a ninth implementation, a non-transitory computer-readable medium storing computer instructions for transmission beam control in a data communication, that when executed by one or more hardware processors, cause the one or more hardware processors to perform operations including: measuring channel qualities of a first plurality of candidate resources and a second plurality of feedback resources for the data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

FIG. 5 is a flow diagram illustrating an example method for transmission beam control in a data communication, according to an implementation.

FIG. 6 is a flow diagram illustrating another example method for transmission beam control in a data communication, according to an implementation.

FIG. 7 is a flow diagram illustrating another example method for transmission beam control in a data communication, according to an implementation.

Like reference numbers and designations in the various drawings indicate like elements.

DETAILED DESCRIPTION OF ILLUSTRATIVE EMBODIMENTS

Figures 1, 2:
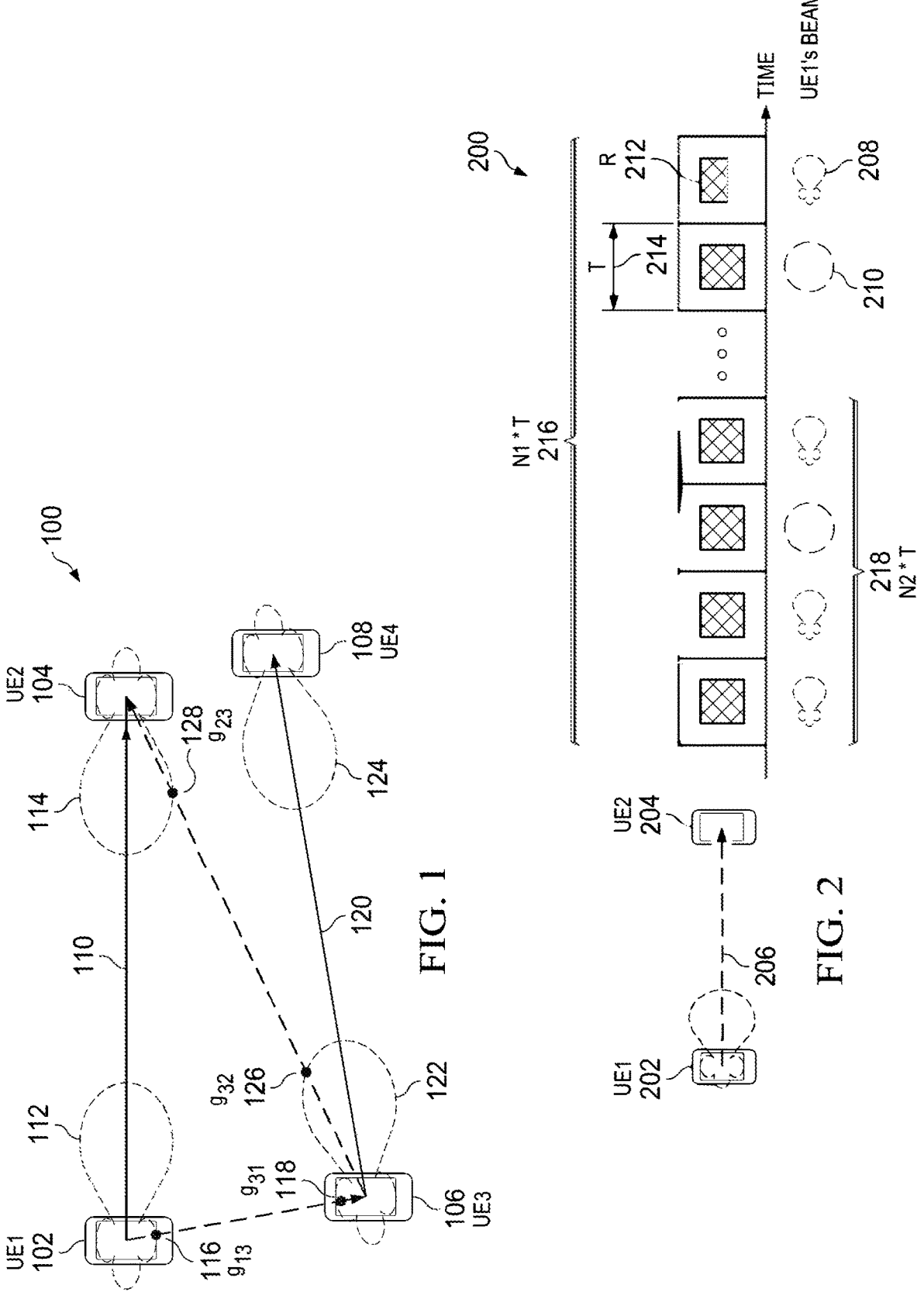
FIG. 1 is a block diagram illustrating data communications between multiple UE, according to an implementation.
FIG. 2 is a block diagram illustrating utilizing two beam patterns for transmission in a data communication, according to an implementation.

The following detailed description describes transmission beam control in wireless communication systems and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In Long Term Evolution (LTE), a sidelink can be defined specifically for direct UE to UE communication without going through a serving base station (such as, an Evolved Node B (eNB)). To allocate resources, such as time or frequency resources, for a sidelink communication, one UE can monitor previous activities of candidate resources, and choose a resource that has not been used in a time period for the sidelink communication. The activities of candidate resources can be monitored based on received signal quality (such as, Reference Signal Receive Power (RSRP)) on the candidate resources. However, this resource allocation mechanism does not work properly in other systems such as New Radio Vehicle-to-Everything (NR-V2X), especially when the NR-V2X operates in mmWave frequency bands and the UE operates in a highly beamformed manner.

The present disclosure describes example implementations of transmission beam control for sidelink communication in wireless communication systems. In the present disclosure, a first electronic device can schedule a periodic sidelink data transmission to a second electronic device on a first resource during a first time period; and transmit data, through a sidelink between the first electronic device and the second electronic device, to the second electronic device on the first resource using at least a first beam and a second beam during the first time period. In some implementations, a first electronic device can measure channel qualities of candidate resources for a sidelink data communication using a first beam; determine a first resource from the candidate resources, where the measured channel quality of the first resource is greater than a first threshold; schedule a periodic data transmission to a second electronic device on the first resource during a first time period; and transmit data to the second electronic device on the first resource using a second beam during the first time period, where a beamwidth of the first beam is greater than a beamwidth of the second beam. In some implementations, a first electronic device can measure channel qualities of candidate resources and feedback resources for a sidelink data communication, where each candidate resource in the candidate resources corresponds to a particular feedback resource in the feedback resources; determine a first resource from the candidate resources based on the measured channel qualities of the candidate resources and the feedback resources; and transmit data to a second electronic device on the first resource.

The subject matter described in the present disclosure can be implemented in particular implementations so as to realize one or more of the following advantages. First, the described approach can reduce the chance of selecting a resource that another UE is using for sensing-based Semi Persistent Scheduling (SPS) transmission. Second, the described approach can reduce interference from another UE's transmission, thereby increasing the overall Device-to-Device (D2D) data rate. Other advantages will be apparent to those of ordinary skill in the art.

FIG. 1 is a block diagram 100 illustrating data communications between multiple UE, according to an implementation. The block diagram 100 includes UE1 102, UE2 104, UE3 106, and UE4 108. For example, UE1 102 communicates with UE2 104 through a sidelink 110, and UE3 106 communicates with UE4 108 through a sidelink 120. In some implementations, additional, different, or fewer UE can be included in the block diagram 100.

As illustrated in FIG. 1, UE1 102 transmits data frames to UE2 104 using resource R1 (e.g., time resource, frequency resource, spatial resource) on the sidelink 110. UE1 102 uses transmit beam pattern 112 to transmit, while UE2 104 uses receive beam pattern 114 to receive. While UE1 102 is transmitting data frames to UE2 104, UE3 106 is triggered to transmit data frames to UE4 108 on the sidelink 120. UE3 106 uses transmit beam pattern 122 to transmit and UE4 108 uses receive beam pattern 124 to receive for the sidelink communication between UE3 106 and UE4 108.

To allocate one or more resources for the sidelink communication between UE3 106 and UE4 108, UE3 106 can sense availability of candidate resources. Since UE1 102's transmit beam toward UE3 106 (g13 116) and UE3 106's receive beam toward UE1 102 (g31 118) are low strength (e.g., the direction from UE1 102 to UE3 106 is not covered by the UE1 102's transmit beam and the UE3 106's receive beam), UE3 106 could determine that resource R1 is available (and unused) even though UE1 102 is using resource R1. As a result, UE3 106 could decide to use resource R1 for its sidelink transmission to UE4 108. In the present disclosure, a direction is considered to be covered if a meaningful amount of transmission power of a beam can be delivered to the direction. For example, if a direction is within a range that a beam gain is greater than a peak beam gain $-X$dB (e.g., $X=3$), the direction is considered to be covered, and the direction is considered to be within a beamwidth of the beam.

As illustrated in FIG. 1, when UE3 106 starts to transmit data frames to UE4 108 using resource R1 on the sidelink 120, UE3 106's transmit beam toward UE2 104 (g32 126) and UE2 104's receive beam toward UE3 106 (g23 128) are high strength. As a result, UE3 106's transmission to UE4 108 has significant impact on UE2 104's reception of UE1 102's transmission. In other words, the sidelink communication between UE3 106 and UE4 108 can interfere with the sidelink communication between UE1 102 and UE2 104.

FIG. 2 is a block diagram 200 illustrating utilizing two beam patterns for transmission in a data communication, according to an implementation. The block diagram 200 includes UE1 202 and UE2 204. For example, UE1 202 transmits data frames to UE2 204 using two beam patterns 208 and 210 on a sidelink 206. In some implementations, additional, different, or fewer UE can be included in the block diagram 200.

To avoid the interference problem described in FIG. 1, when one UE transmits data frames to another UE on a resource periodically during a time period, the UE can use more than one transmit beam. For example, in addition to the transmit beam with the transmit beam pattern 112 illustrated in FIG. 1, the UE can form another transmit beam to transmit data frames occasionally during the time period. The formed transmit beam can be wider than the transmit beam with the transmit beam pattern 112 illustrated in FIG. 1. For example, the formed transmit beam can be an omni-directional beam or similar to an omni-directional beam. When one nearby UE senses candidate resources for sidelink transmission, the received signal strength on the resource can be high at least occasionally (i.e., when the UE uses a wider beam for transmission), thereby preventing the nearby UE from scheduling sidelink data transmission on the resource.

As illustrated in FIG. 2, UE1 202 transmits data frames to UE2 204 on the sidelink 206. UE1 202 can utilize at least two transmit beams with beam patterns 208 and 210 for the sidelink communication. For example, the first beam with beam pattern 208 has higher beam gain toward UE2 204 than the second beam with beam pattern 210. The second beam with beam pattern 210 is an omni-directional beam. During a time period 216, UE1 202 schedules resource R 212 for N1 times with a periodicity of time T 214, and transmits data frames on resource R 212. For example, UE1 202 can use the second beam with beam pattern 210 at least once in every N2*T period 218 within the N1*T period 216. N1 and N2 are positive integers, and N2 is less than N1. In addition, UE1 202 can use the first beam with beam pattern 208 for the rest of the sidelink transmission within the N1*T period 216. In some implementations, actual beam patterns of the first beam for each different transmission within the N1*T period 216 can be different from each other based on, for example, real time channel status between UE1 202 and UE2 204.

In some implementations, when scheduling resource R 212, UE1 202 can consider signal quality of each of a plurality of candidate resources in a previous time period (e.g., a time period having a same or similar length of the time period 218). UE1 202 can then use the second beam with beam pattern 210 periodically during the N1*T period 216. UE1 202 can determine the number of occurrences of the second beam based on the signal quality of each candidate resource. For example, if received signal strength on a candidate resource is above a first threshold (e.g., signal strength from another transmission already on the candidate resource is high), UE1 202 can determine that the candidate resource is being used by another UE. The received signal strength can be calculated based on Reference Signal Received Power (RSRP). The first threshold can be set to, for example, $-100$ decibel-milliwatts (dBm). If RSRP on a candidate resource is greater than $-1000$ dBm, UE1 202 can determine that another UE is transmitting on the candidate resource and that the candidate resource is considered occupied.

If the number of occupied resources is higher than a second threshold, UE1 202 can use the second beam N3 times during the N1*T period 216. However, if the number of occupied resources is lower than the second threshold, UE1 202 can use the second beam N4 times during the N1*T period 216. N3 and N4 are positive integers, and N3 is greater than N4. The second threshold can be set to, for example, 10 when there are 100 candidate resources. In other words, if there is a large percentage of occupied resources, there is a relatively large number of UE operating in sidelink communication. As a result, it is better to use wide beam more frequently to avoid interference (e.g., to protect resource R 212 from being considered by another UE as an available resource). However, if there is a small percentage of occupied resources, there is a relatively small number of UE operating in sidelink communication. As a result, it is better to use highly beamformed signals more frequently to improve data throughput since the chance of collision is low.

Figure 3:
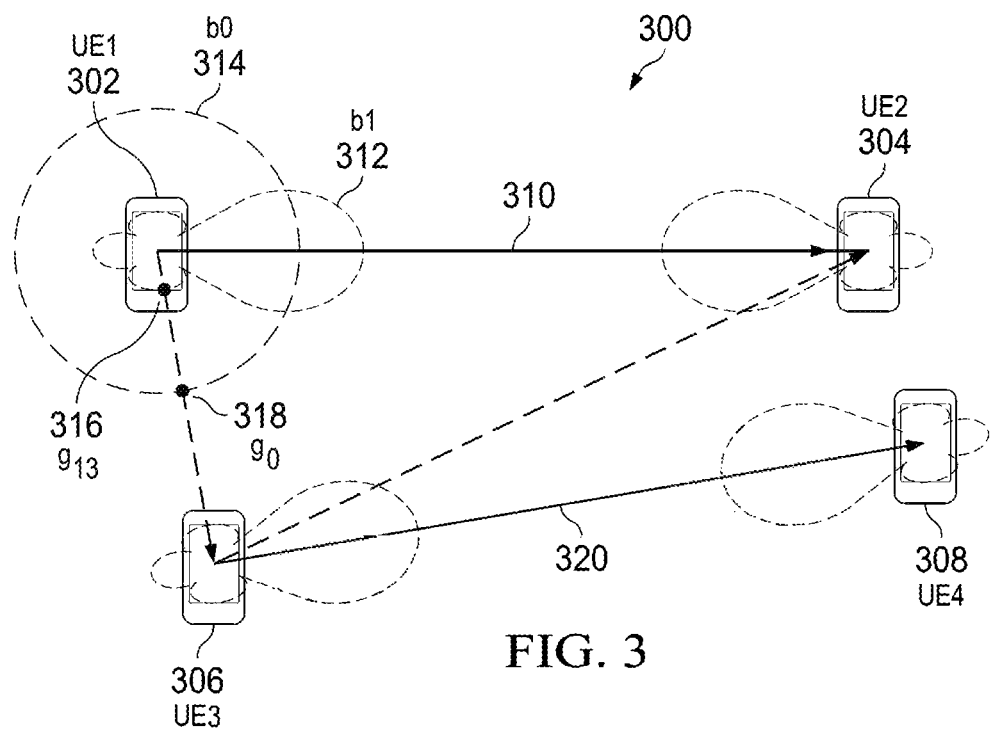
FIG. 3 is a block diagram illustrating data communications between multiple UE with one UE utilizing two beam patterns for transmission, according to an implementation.

FIG. 3 is a block diagram 300 illustrating data communications between multiple UE with one UE utilizing two beam patterns for transmission, according to an implementation. The block diagram 300 includes UE1 302, UE2 304, UE3 306, and UE4 308. For example, UE1 302 transmits data frames to UE2 304 using two different beam patterns (b1 312 and b0 314) on a sidelink 310, and UE3 306 transmits data frames to UE4 308 on a sidelink 320. In some implementations, additional, different, or fewer UE can be included in the block diagram 300.

Different from using a single transmit beam pattern 112 in FIG. 1, two different beam patterns are used for sidelink communication between UE1 302 and UE2 304 in FIG. 3. As illustrated in FIG. 3, UE1 302 transmits data frames to UE2 304 using resource R1 on the sidelink 310. UE1 302 can use two different transmit beam patterns (b1 312 and b0 314) to transmit. For example, UE1 302 can use the beam pattern b1 312 most of the time, and use the beam pattern b0 314 occasionally during the sidelink transmission to UE2 304. The beam pattern b1 312 has higher beam gain toward UE2 304 than the beam pattern b0 314. The beam pattern b0 314 is an omni-directional beam pattern. The beam pattern b0 314 has higher beam gain toward UE3 306 than the beam pattern b1 312 (i.e., go 318 is greater than g13 316).

While UE1 302 is transmitting data frames to UE2 304, UE3 306 is triggered to transmit data frames to UE4 308 on the sidelink 320. To allocate one or more resources for the sidelink communication between UE3 306 and UE4 308, UE3 306 can sense availability of candidate resources. Since UE1 302 transmits with the beam pattern b0 314 occasionally, UE3 306 can sense the go 318 (e.g., antenna gain toward UE3 306 is higher than a threshold) on resource R1, and consider resource R1 as being occupied by another UE. As a result, UE3 306 does not consider resource R1 for its sidelink transmission to UE4 308. In other words, UE3 306 picks another resource R2 (i.e., not resource R1), and transmits to UE4 308 on resource R2. Since R2 is different from R1, there is no cross-interference between UE3 306's transmission and UE1 302's transmission.

Figure 4:
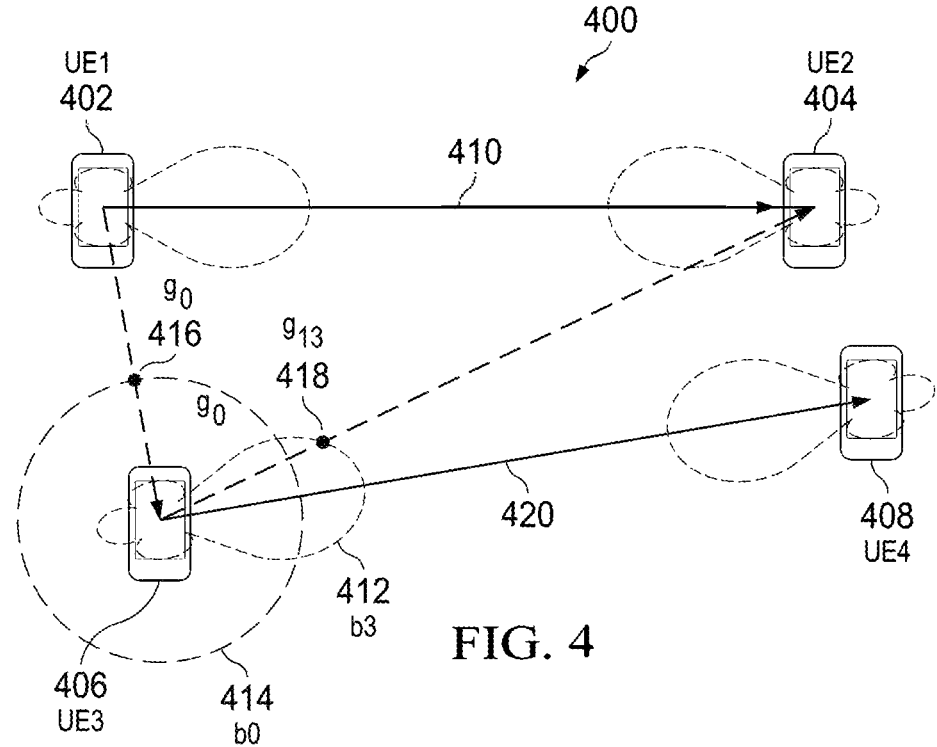
FIG. 4 is a block diagram illustrating data communications between multiple UE with one UE utilizing two beam patterns for transmission and monitoring, according to an implementation.

FIG. 4 is a block diagram 400 illustrating data communications between multiple UE with one UE utilizing two beam patterns for transmission and monitoring, according to an implementation. The block diagram 400 includes UE1 402, UE2 404, UE3 406, and UE4 408. For example, UE1 402 transmits data frames to UE2 404 on a sidelink 410, and UE3 406 transmits data frames to UE4 408 on a sidelink 420. UE3 406 can use different beam pattern for data transmission and channel monitoring (e.g., b3 412 for data transmission and b0 414 for channel monitoring). In some implementations, additional, different, or fewer UE can be included in the block diagram 400.

When one UE needs to transmit data frames to another UE on a resource periodically during a time period on a sidelink, the UE can monitor signal quality of candidate resources with a first beam. After the UE determines a first resource for the sidelink transmission based on at least the monitored signal quality of candidate resources, the UE can transmit on the first resource using a second beam. The first beam can be wider than the second beam. For example, the UE can transmit data frames using highly beamformed signals to improve data throughput. When sensing candidate resources, the UE can use, for example, an omni-directional receive beam to improve accuracy of identifying another UE's occupancy on a candidate resource.

As illustrated in FIG. 4, UE1 402 transmits data frames to UE2 404 using resource R1 on the sidelink 410. While UE1 402 is transmitting data frames to UE2 404, UE3 406 is triggered to transmit data frames to UE4 108 on the sidelink 420. UE3 406 can use the beam pattern b3 412 for sidelink transmission to UE4 408, and use the beam pattern b0 414 for monitoring availability of candidate resources. The beam pattern b0 414 is an omni-directional beam pattern, which has beam gain toward UE1 402 of go 416.

To allocate one or more resources for the sidelink communication between UE3 406 and UE4 408, UE3 406 can sense availability of candidate resources with the beam pattern b0 414. Since UE3 406 monitors candidate resources with the beam pattern b0 414, UE3 406 can sense the go 416 (e.g., antenna gain toward UE1 402 is higher than a threshold) on resource R1, and consider resource R1 as being occupied by another UE. As a result, UE3 406 does not consider resource R1 for its sidelink transmission to UE4 408. In other words, UE3 406 picks another resource R2 (i.e., not resource R1), and transmits to UE4 408 on resource R2. Since R2 is different from R1, even though UE3 406's transmit beam toward UE2 404 (g13 418) is high, there is no cross-interference between UE3 406's transmission on resource R2 and UE1 402's transmission on resource R1.

In some implementations, one UE can select a resource for sidelink transmission to prevent cross-interference from other sidelink communication. For example, when one UE transmits data frames to another UE on a resource periodically during a time period on a sidelink, the UE can monitor signal quality of candidate resources. The UE can determine a first resource that is not considered to be occupied by another UE for the sidelink transmission based on at least the monitored signal quality of candidate resources. The UE can then transmit on the first resource.

A resource is considered to be occupied by another UE if at least one of received signal strength on the resource is above a first threshold, or received signal strength on a second resource corresponding to the resource is above a second threshold. For example, the resource can be a resource that the UE is monitoring for sidelink transmission (e.g., a Physical Sidelink Shared Channel (PSSCH)). The second resource can be a feedback resource corresponding to the resource (e.g., a Physical Sidelink Feedback Channel (PSFCH)). Since the resource and the second resource have different channel structures, the first threshold and the second threshold are determined separately. In some implementations, the first threshold and the second threshold can be the same (e.g., −100 dBm). In some implementations, the first threshold and the second threshold can be different.

In some implementations, one or more of the following signals can be delivered in the second resource: reference signal for channel measurement (such as, Demodulation Reference Signal (DMRS), Channel State Information Reference Signal (CSI-RS), and Sounding Reference Signal (SRS)), hybrid automatic repeat request (HARQ) acknowledgement (e.g., ACK/NACK), channel measurement feedback (e.g., Channel Quality Indicator (CQI), Rank Indication (RI), Pre-coding Matrix Indicator (PMI)), and separate data transmission from the receiving UE to the transmitting UE.

Multiple mechanisms can be used by the UE to identify the information on the second resource. For example, a mapping between a resource for sidelink transmission and another resource for a response can be predetermined. As a result, no additional indication is needed. In some implementations, a serving base station that a transmitting UE belongs to can configure a mapping between a resource for sidelink transmission and another resource for a response, and indicate the mapping information to one or more UE in its coverage. In some implementations, one UE that transmits a data frame on a sidelink can indicate information on a resource for a response using sidelink control information (SCI). In some implementations, one UE that transmits a data frame on a sidelink can indicate location information of its receiving UE so that one or more nearby UE can estimate the location of the receiving UE. For example, the UE can indicate the location information of its receiving UE occasionally.

FIG. 5 is a flow diagram illustrating an example method 500 for transmission beam control in a data communication, according to an implementation. For clarity of presentation, the description that follows generally describes method 500 in the context of the other figures in this description. The method 500 can be implemented by an electronic device, e.g., UE1 302 illustrated in FIG. 3. However, it will be understood that the method 500 may be performed, for example, by any suitable system, environment, software, and hardware, or a combination of systems, environments, software, and hardware, as appropriate. In some implementations, various steps of the method 500 can be run in parallel, in combination, in loops, or in any order.

The method 500 begins at 502, where an electronic device schedules a periodic data transmission to a second electronic device on a first resource during a first time period. In some implementations, the data communication between the electronic device and the second electronic device can be a sidelink data communication (e.g., without passing through a base station). In some implementations, the periodic data transmission can be scheduled or otherwise planned in advance with the multiple transmit beams, as further described below.

At 504, the electronic device transmits data, through a sidelink between the electronic device and the second electronic device, to the second electronic device on the first resource using at least a first beam and a second beam during the first time period. For example, during the first time period, one or more data frames can be transmitted to the second electronic device on the first resource using the first beam, and one or more data frames can be transmitted to the second electronic device on the first resource using the second beam. A beamwidth of the first beam can be less than a beamwidth of the second beam. In some implementations, the second beam can be an omni-directional beam, and the first beam can have higher beam gain toward the second electronic device than the second beam. In some implementations, the first beam and the second beam can be scheduled at step 502.

In some implementations, during the first time period, for every N consecutive transmissions to the second electronic device, N2 transmissions can use the second beam and N1 transmissions can use the first beam. N, N1, and N2 are positive integers. N1+N2=N. N2 can be less than N1. In some implementations, N2=1. In some implementations, at least 2N consecutive transmissions occur during the first time period.

In some implementations, before scheduling the periodic data transmission, the electronic device can measure channel qualities of a plurality of candidate resources for the data communication. The electronic device can then determine the first resource from the plurality of candidate resources. The measured channel quality of the first resource can be greater than a first threshold. For example, the measured Reference Signal Receive Power (RSRP) on the first resource is greater than −100 dBm.

FIG. 6 is a flow diagram illustrating another example method 600 for transmission beam control in a data communication, according to an implementation. For clarity of presentation, the description that follows generally describes method 600 in the context of the other figures in this description. The method 600 can be implemented by an electronic device, e.g., UE3 406 illustrated in FIG. 4. However, it will be understood that the method 600 may be performed, for example, by any suitable system, environment, software, and hardware, or a combination of systems, environments, software, and hardware, as appropriate. In some implementations, various steps of the method 600 can be run in parallel, in combination, in loops, or in any order.

The method 600 begins at 602, where an electronic device measures channel qualities of a plurality of candidate resources for a data communication using a first beam. For example, the electronic device can measure RSRP for each candidate resource. In some implementations, the first beam can be an omni-directional beam. In some implementations, the data communication is a sidelink data communication.

At 604, the electronic device determines a first resource from the plurality of candidate resources. In some implementations, the first resource can be determined based on the measured channel quality of the first resource being greater than a first threshold. For example, the measured RSRP on the first resource is greater than −100 dBm.

At 606, the electronic device schedules a periodic data transmission to a second electronic device on the first resource during a first time period.

At 608, the electronic device transmits data to the second electronic device on the first resource using a second beam during the first time period. A beamwidth of the first beam can be greater than a beamwidth of the second beam.

FIG. 7 is a flow diagram illustrating another example method 700 for transmission beam control in a data communication, according to an implementation. For clarity of presentation, the description that follows generally describes method 700 in the context of the other figures in this description. The method 700 can be implemented by an electronic device, e.g., UE1 402 illustrated in FIG. 4. However, it will be understood that the method 700 may be performed, for example, by any suitable system, environment, software, and hardware, or a combination of systems, environments, software, and hardware, as appropriate. In some implementations, various steps of the method 700 can be run in parallel, in combination, in loops, or in any order.

The method 700 begins at 702, where an electronic device measures channel qualities of a first plurality of candidate resources and a second plurality of feedback resources for the data communication. Each candidate resource in the first plurality of candidate resources can correspond to a particular feedback resource in the second plurality of feedback resources. In some implementations, the particular candidate resource can be a Physical Sidelink Shared Channel (PSSCH), and the feedback resource corresponding to the particular candidate resource can be a Physical Sidelink Feedback Channel (PSFCH).

At 704, the electronic device determines a first resource from the first plurality of candidate resources based on the measured channel qualities of the first plurality of candidate resources and the second plurality of feedback resources. In some implementations, the first resource can be a candidate resource not occupied by other electronic devices. In some implementations, a particular candidate resource is occupied by other electronic devices if at least one of received signal strength of the particular candidate resource is above a first threshold, or received signal strength of a feedback resource corresponding to the particular candidate resource is above a second threshold. In some implementations, the first threshold and the second threshold can be the same (e.g., −100 dBm). In some implementations, the first threshold and the second threshold can be different.

At 706, the electronic device transmits data to a second electronic device on the first resource. In some implementations, the electronic device can transmit data to the second electronic device on the first resource through a sidelink.

Figure 8:
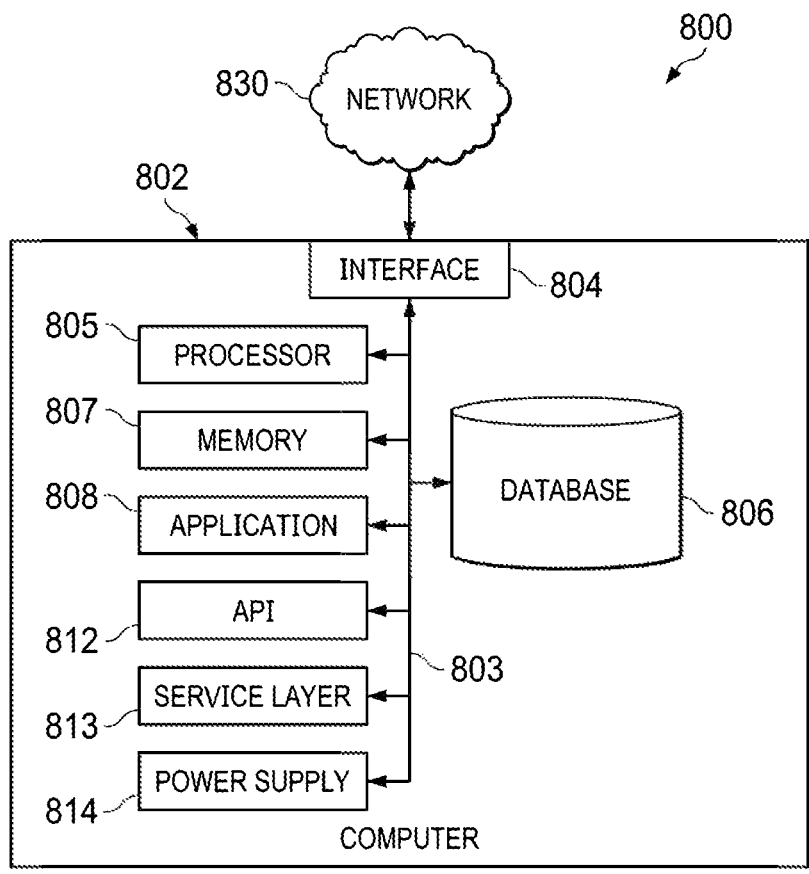
FIG. 8 is a block diagram of an example computer system used to provide computational functionalities associated with described algorithms, methods, functions, processes, flows, and procedures, as described in the instant disclosure, according to an implementation.

FIG. 8 is a block diagram of an example computer system 800 used to provide computational functionalities associated with described algorithms, methods, functions, processes, flows, and procedures, as described in the instant disclosure, according to an implementation. The computer system 800, or more than one computer system 800, can be used to implement the electronic device described previously in this disclosure, e.g., UE1 302 illustrated in FIG. 3.

In some aspects, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a graphical user interface (GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include, or be communicably coupled with, an application server, e-mail server, web server, caching server, streaming data server, or other server (or a combination of servers).

The computer 802 can receive requests over network 830 from a client application (for example, executing on another computer 802) and respond to the received requests by processing the received requests using an appropriate software application(s). In addition, requests may also be sent to the computer 802 from internal users (for example, from a command console or by other appropriate access methods), external or third-parties, other automated applications, as well as any other appropriate entities, individuals, systems, or computers.

Each of the components of the computer 802 can communicate using a system bus 803. In some implementations, any or all of the components of the computer 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable formats. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 includes logic encoded in software or hardware (or a combination of software and hardware) and is operable to communicate with the network 830. More specifically, the interface 804 may include software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). For example, memory 807 can be Random Access Memory (RAM), Read Only Memory (ROM), optical, magnetic, and the like, storing data consistent with this disclosure. In some implementations, memory 807 can be a combination of two or more different types of memory (for example, a combination of RAM and magnetic storage) according to particular needs, desires, or particular implementations of the computer 802 and the described functionality. Although illustrated as a single memory 807 in FIG. 8, two or more memories 807 (of the same or a combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power supply 814 can include a power plug to allow the computer 802 to be plugged into a wall socket or other power source to, for example, power the computer 802 or recharge a rechargeable battery.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

Figure 9:
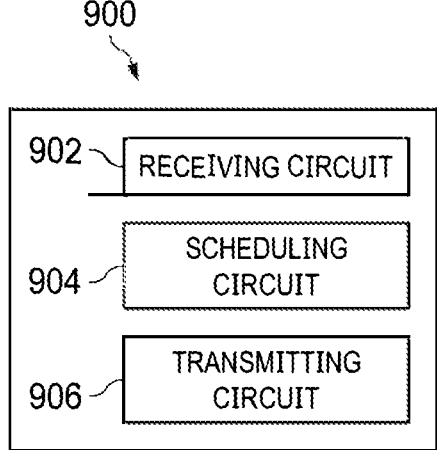
FIG. 9 is a schematic diagram illustrating an example structure of a terminal described in the present disclosure, according to an implementation.

FIG. 9 is a schematic diagram illustrating an example structure of a terminal 900 described in the present disclosure, according to an implementation. The terminal 900 includes a receiving circuit 902, a scheduling circuit 904, and a transmitting circuit 906. In some implementations, terminal 900 can further include one or more circuits for performing any one or a combination of steps described in the present disclosure.

The receiving circuit 902 is configured to receive signals from candidate resources.

The scheduling circuit 904 is configured to schedule a periodic data transmission to a second terminal on a first resource during a first time period.

The transmitting circuit 906 is configured to transmit data, through a sidelink between the terminal and the second terminal, to the second terminal on the first resource using at least a first beam and a second beam during the first time period.

Described implementations of the subject matter can include one or more features, alone or in combination.

In a first implementation, a method by an electronic device for transmission beam control in a data communication includes: scheduling a periodic data transmission to a second electronic device on a first resource using at least a first beam and a second beam during a first time period; and transmitting data, through a sidelink between the electronic device and the second electronic device, to the second electronic device on the first resource using at least the first beam and the second beam during the first time period.

The foregoing and other described implementations can each, optionally, include one or more of the following features:

A first feature, combinable with any of the following features, where transmitting the data to the second electronic device on the first resource using at least the first beam and the second beam during the first time period includes: transmitting one or more data frames to the second electronic device on the first resource using the first beam during the first time period; and transmitting one or more data frames to the second electronic device on the first resource using the second beam during the first time period, where a beamwidth of the first beam is less than a beamwidth of the second beam.

A second feature, combinable with any of the previous or following features, where the second beam is an omni-directional beam, and the first beam has higher beam gain toward the second electronic device than the second beam.

A third feature, combinable with any of the previous or following features, where during the first time period, for every N consecutive transmissions to the second electronic device, N2 transmissions use the second beam and N1 transmissions use the first beam, N1+N2=N, and N2 is less than N1, and where at least 2N consecutive transmissions occur during the first time period.

A fourth feature, combinable with any of the previous or following features, where before scheduling the periodic data transmission, the method further includes: measuring channel qualities of a plurality of candidate resources for the data communication; and determining the first resource from the plurality of candidate resources, where the measured channel quality of the first resource is greater than a first threshold.

A fifth feature, combinable with any of the previous or following features, where the data communication is a sidelink data communication.

In a second implementation, an electronic device includes: a non-transitory memory storage comprising instructions; and one or more hardware processors in communication with the memory storage, where the one or more hardware processors execute the instructions to perform operations comprising: scheduling a periodic data transmission to a second electronic device on a first resource using at least a first beam and a second beam during a first time period; and transmitting data, through a sidelink between the electronic device and the second electronic device, to the second electronic device on the first resource using at least the first beam and the second beam during the first time period.

The foregoing and other described implementations can each, optionally, include one or more of the following features:

A first feature, combinable with any of the following features, where transmitting the data to the second electronic device on the first resource using at least the first beam and the second beam during the first time period comprises: transmitting one or more data frames to the second electronic device on the first resource using the first beam during the first time period; and transmitting one or more data frames to the second electronic device on the first resource using the second beam during the first time period, where a beamwidth of the first beam is less than a beamwidth of the second beam.

A second feature, combinable with any of the previous or following features, where the second beam is an omni-directional beam, and the first beam has higher beam gain toward the second electronic device than the second beam.

A third feature, combinable with any of the previous or following features, where during the first time period, for every N consecutive transmissions to the second electronic device, N2 transmissions use the second beam and N1 transmissions use the first beam, N1+N2=N, and N2 is less than N1, and where at least 2N consecutive transmissions occur during the first time period.

A fourth feature, combinable with any of the previous or following features, where before scheduling the periodic data transmission, the operations further comprise: measuring channel qualities of a plurality of candidate resources for the data communication; and determining the first resource from the plurality of candidate resources, where the measured channel quality of the first resource is greater than a first threshold.

A fifth feature, combinable with any of the previous or following features, where the data communication is a sidelink data communication.

In a third implementation, a non-transitory computer-readable medium storing computer instructions for transmission beam control in a data communication, that when executed by one or more hardware processors, cause the one or more hardware processors to perform operations comprising: scheduling a periodic data transmission to a second electronic device on a first resource using at least a first beam and a second beam during a first time period; and transmitting data, through a sidelink, to the second electronic device on the first resource using at least the first beam and the second beam during the first time period.

The foregoing and other described implementations can each, optionally, include one or more of the following features:

A first feature, combinable with any of the following features, where transmitting the data to the second electronic device on the first resource using at least the first beam and the second beam during the first time period comprises: transmitting one or more data frames to the second electronic device on the first resource using the first beam during the first time period; and transmitting one or more data frames to the second electronic device on the first resource using the second beam during the first time period, where a beamwidth of the first beam is less than a beamwidth of the second beam.

A second feature, combinable with any of the previous or following features, where the second beam is an omni-directional beam, and the first beam has higher beam gain toward the second electronic device than the second beam.

A third feature, combinable with any of the previous or following features, where during the first time period, for every N consecutive transmissions to the second electronic device, N2 transmissions use the second beam and N1 transmissions use the first beam, N1+N2=N, and N2 is less than N1, and where at least 2N consecutive transmissions occur during the first time period.

A fourth feature, combinable with any of the previous or following features, where before scheduling the periodic data transmission, the operations further comprise: measuring channel qualities of a plurality of candidate resources for the data communication; and determining the first resource from the plurality of candidate resources, where the measured channel quality of the first resource is greater than a first threshold.

A fifth feature, combinable with any of the previous or following features, where the data communication is a sidelink data communication.

In a fourth implementation, a method by an electronic device for transmission beam control in a data communication includes: measuring channel qualities of a plurality of candidate resources for the data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

The foregoing and other described implementations can each, optionally, include one or more of the following features:

A first feature, combinable with any of the following features, where the first beam is an omni-directional beam.

A second feature, combinable with any of the previous or following features, where the data communication is a sidelink data communication.

In a fifth implementation, an electronic device includes: a non-transitory memory storage comprising instructions; and one or more hardware processors in communication with the memory storage, where the one or more hardware processors execute the instructions to perform operations comprising: measuring channel qualities of a plurality of candidate resources for a data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

The foregoing and other described implementations can each, optionally, include one or more of the following features:

A first feature, combinable with any of the following features, where the first beam is an omni-directional beam.

A second feature, combinable with any of the previous or following features, where the data communication is a sidelink data communication.

In a sixth implementation, a non-transitory computer-readable medium storing computer instructions for transmission beam control in a data communication, that when executed by one or more hardware processors, cause the one or more hardware processors to perform operations comprising: measuring channel qualities of a plurality of candidate resources for the data communication using a first beam; determining a first resource from the plurality of candidate resources, where the measured channel quality of the first resource is greater than a first threshold; scheduling a periodic data transmission to a second electronic device on the first resource during a first time period; and transmitting data to the second electronic device on the first resource using a second beam during the first time period, where a beamwidth of the first beam is greater than a beamwidth of the second beam.

The foregoing and other described implementations can each, optionally, include one or more of the following features:

A first feature, combinable with any of the following features, where the first beam is an omni-directional beam.

A second feature, combinable with any of the previous or following features, where the data communication is a sidelink data communication.

In a seventh implementation, a method by an electronic device for transmission beam control in a data communication includes: measuring channel qualities of a first plurality of candidate resources and a second plurality of feedback resources for the data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

The foregoing and other described implementations can each, optionally, include one or more of the following features:

A first feature, combinable with any of the following features, where determining the first resource comprises determining at least one of: that a received signal strength of the first resource is below a first threshold; or that a received signal strength of a feedback resource corresponding to the first resource is below a second threshold.

A second feature, combinable with any of the previous or following features, where the first resource is a Physical Sidelink Shared Channel (PSSCH), and the feedback resource corresponding to the first resource is a Physical Sidelink Feedback Channel (PSFCH).

In an eighth implementation, an electronic device includes: a non-transitory memory storage comprising instructions; and one or more hardware processors in communication with the memory storage, where the one or more hardware processors execute the instructions to perform operations comprising: measuring channel qualities of a first plurality of candidate resources and a second plurality of feedback resources for a data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

The foregoing and other described implementations can each, optionally, include one or more of the following features:

A first feature, combinable with any of the following features, where determining the first resource comprises determining at least one of: that a received signal strength of the first resource is below a first threshold; or that a received signal strength of a feedback resource corresponding to the first resource is below a second threshold.

A second feature, combinable with any of the previous or following features, where the first resource is a Physical Sidelink Shared Channel (PSSCH), and the feedback resource corresponding to the first resource is a Physical Sidelink Feedback Channel (PSFCH).

In a ninth implementation, a non-transitory computer-readable medium storing computer instructions for transmission beam control in a data communication, that when executed by one or more hardware processors, cause the one or more hardware processors to perform operations comprising: measuring channel qualities of a first plurality of candidate resources and a second plurality of feedback resources for the data communication, where each candidate resource in the first plurality of candidate resources corresponds to a particular feedback resource in the second plurality of feedback resources; determining a first resource from the first plurality of candidate resources based on the measured channel qualities of the first plurality of candidate resources and the second plurality of feedback resources; and transmitting data to a second electronic device on the first resource.

The foregoing and other described implementations can each, optionally, include one or more of the following features:

A first feature, combinable with any of the following features, where determining the first resource comprises determining at least one of: that a received signal strength of the first resource is below a first threshold; or that a received signal strength of a feedback resource corresponding to the first resource is below a second threshold.

A second feature, combinable with any of the previous or following features, where the first resource is a Physical Sidelink Shared Channel (PSSCH), and the feedback resource corresponding to the first resource is a Physical Sidelink Feedback Channel (PSFCH).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer readable media (transitory or non-transitory, as appropriate) suitable for storing computer program instructions and data includes non volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
   scheduling, by a user equipment (UE), a periodic data transmission to a second UE on a first resource using at least a first beam and a second beam during a first time period; and
   transmitting, by the UE to the second UE, data, through a sidelink between the UE and the second UE, on the first resource using at least the first beam and the second beam during the first time period, wherein the transmitting the data to the second UE on the first resource using at least the first beam and the second beam during the first time period comprises:
      transmitting, by the UE, one or more data frames in a Physical Sidelink Shared Channel (PSSCH) to the second UE on the first resource using the first beam during the first time period; and
      transmitting, by the UE, the one or more data frames in the PSSCH to the second UE on the first resource using the second beam during the first time period, wherein the first beam has higher beam gain toward the second UE than the second beam, wherein the second beam is an omni-directional beam, and wherein a first beamwidth of the first beam is less than a second beamwidth of the second beam such that the second beam prevents a nearby UE from scheduling sidelink data transmission on the first resource,
   wherein during the first time period, for every N consecutive transmissions to the second UE, N2 transmissions use the second beam and N1 transmissions use the first beam, N1+N2=N, and N2 is less than N1, and wherein at least 2N consecutive transmissions occur during the first time period.

2. The method according to claim 1, wherein before the scheduling the periodic data transmission, the method further comprises:
   measuring, by the UE, channel qualities of a plurality of candidate resources for the periodic data transmission; and

determining, by the UE, the first resource from the plurality of candidate resources, wherein a measured channel quality of the first resource is greater than a first threshold.

3. The method according to claim 1, wherein the periodic data transmission is a sidelink data communication.

4. A method, comprising:

measuring, by a user equipment (UE), channel qualities of a plurality of candidate resources for data communication in a Physical Sidelink Shared Channel (PSSCH) using a first beam, wherein the first beam is an omni-directional beam;

determining, by the UE, a first resource from the plurality of candidate resources, wherein a measured channel quality of the first resource is greater than a first threshold;

scheduling, by the UE, a periodic data transmission to a second UE on the first resource during a first time period; and transmitting, by the UE to the second UE, data in the PSSCH on the first resource using a second beam during the first time period, wherein a first beamwidth of the first beam is greater than a second beamwidth of the second beam.

5. The method according to claim 4, wherein the data communication is a sidelink data communication.

6. A method, comprising:

measuring, by a user equipment (UE), channel qualities of a first plurality of candidate transmission resources and a second plurality of feedback resources for data communication, wherein each candidate transmission resource in the first plurality of candidate transmission resources corresponds to a different feedback resource in the second plurality of feedback resources;

determining, by the UE, a first resource from the first plurality of candidate transmission resources based on the measured channel qualities of the first plurality of candidate transmission resources and the second plurality of feedback resources; and transmitting, by the UE, data to a second UE on the first resource.

7. The method according to claim 6, wherein the determining the first resource comprises determining at least one of:

that a received signal strength of the first resource is below a first threshold; or that a received signal strength of a feedback resource corresponding to the first resource is below a second threshold.

8. The method according to claim 7, wherein the first resource is a Physical Sidelink Shared Channel (PSSCH), and the feedback resource corresponding to the first resource is a Physical Sidelink Feedback Channel (PSFCH).

9. The method according to claim 1, the second beam prevents the nearby UE from scheduling the sidelink data transmission on the first resource while interference from the first beam on the first resource is undetectable by the nearby UE.

* * * * *